Jan. 14, 1936.                C. A. SMITH                2,028,024
                           ICE SCORING DEVICE
                           Filed Nov. 1, 1934

Charles A. Smith
INVENTOR

BY Victor J. Evans & Co.
ATTORNEY

UNITED STATES PATENT OFFICE 2,028,024

ICE SCORING DEVICE

Charles A. Smith, Wellsville, Kans.

Application November 1, 1934, Serial No. 751,051

2 Claims. (Cl. 125—14)

This invention relates to ice scoring devices and has for the primary object the provision of a device of this character which is especially adapted for guiding the movements of a portable ice cutting saw over a cake of ice so that the latter will be cut into sections or blocks of determined weights and may readily be applied to a cake of ice while supported by a truck forming the subject matter of a co-pending application filed November, 1, 1934 and Serial No. 751,050.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a top plan view illustrating an ice scoring device constructed in accordance with my invention and showing the same applied to a cake of ice.

Figure 1:
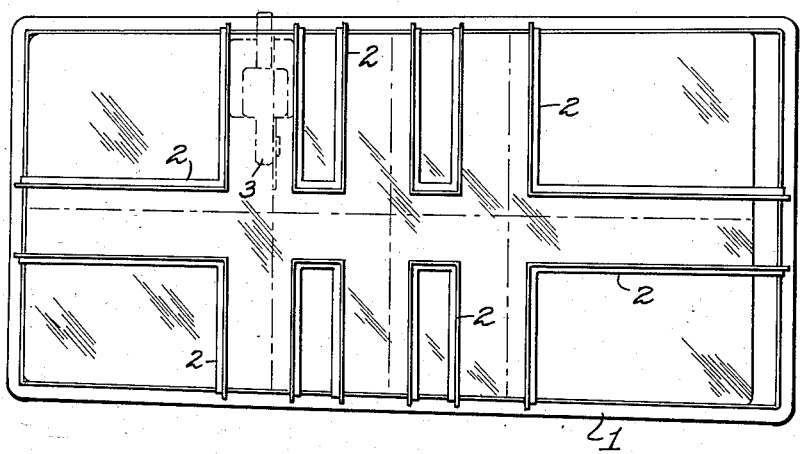
Figure 2:
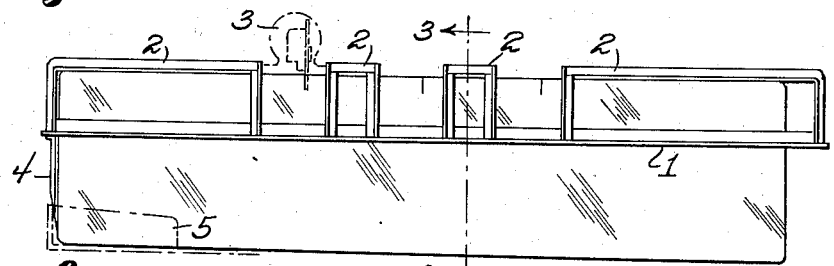
Figure 2 is a side elevation illustrating the same.
Figure 3:
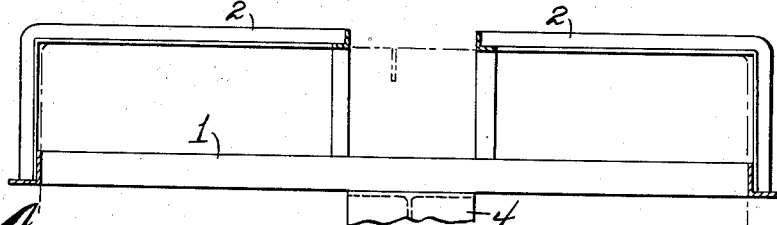
Figure 3 is a sectional view taken on the line 3—3 of Figure 2.
Figure 4:
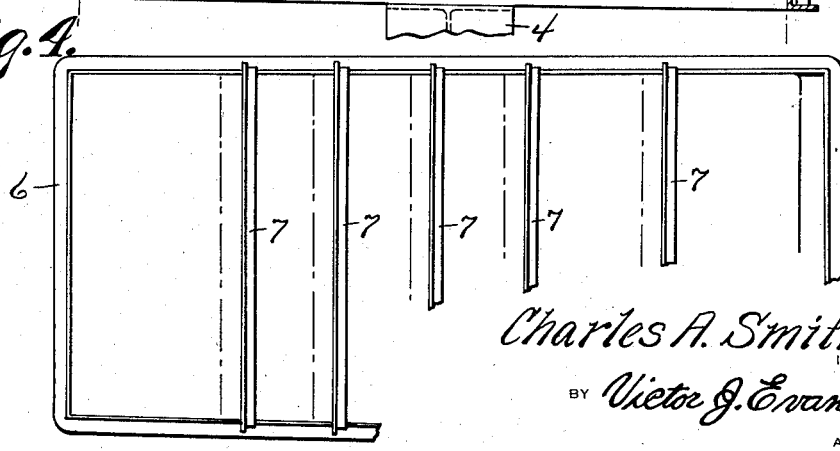
Figure 4 is a fragmentary top plan view illustrating a modified form of my invention.

Referring in detail to the drawing, the numeral 1 indicates a main frame of substantially rectangular shape and is of a size to fit readily about a cake of ice. It is to be noted that the frame tapers slightly towards one end in accordance with the usual contour or shape of a cake of ice. The frame is adjusted to the cake of ice so that the larger end of the frame is slightly spaced from the cake of ice to allow for variations in the length of different cakes. The frame is placed around the edges and ends of the cake of ice downwardly from the top surface so that it leaves a clear and unobstructed path for the movement of the saw 3 crosswise and lengthwise over the cake of ice. The frame is to be made in varying sizes, adapted to fit neatly about cakes of ice of different sizes and weights.

A series of combined guides and ice measuring elements 2 are formed integrally with the main frame 1 and are adapted to rest upon the top surface of the ice, extending down the edges and ends to the main frame. Certain of said elements 2 include substantially rectangular shaped portions disposed over the top surface of the ice and are arranged at the corners of the main frame. The other of said elements 2 include portions of elongated formation overlying and resting upon the top surface of the ice and arranged in pairs, one being disposed opposite to the other. The areas of ice defined within said elements 2 will be of determined weights when the cake of ice is scored by a portable cutting device 3, the latter preferably being in the form of a motor driven rotatable saw which is adapted to be moved manually over the cake of ice with the elements 2 acting as a guide therefor. The cake of ice when scored or cut on the dotted lines, as shown in Figure 1, will be made into a series of sections or blocks of ice, these sections or blocks weighing determined amounts, and readily broken apart with an ice pick or similar tool. Thus through the use of this device a person may readily cut a cake of ice into blocks so that said blocks will be of selected weights, permitting the cutting of the ice for sale without waste, and providing an economical device which can be afforded by persons operating small ice plants, or selling ice from delivery vehicles.

The small end of the main frame 1 carries a depending extension 4 adapted to engage with a shoe 5 on a truck, (not shown) and which forms the subject matter of a co-pending application. It is preferable that the projection 4 be reinforced by a rib and also be tapered at its free end to facilitate the insertion of the projection between the shoe and the cake of ice. Further, it is desirable that the frame 1 and the elements 2 be constructed of angle iron so as to engage evenly with the cake of ice when applied thereto, and further the elements 2 being constructed of such material will more effectively guide the movement of the cutting device 3.

Referring to my modified form of invention, it consists of a main frame 6 constructed similar to the main frame 1 and has secured thereto at spaced intervals combined guide and measuring elements 7 each preferably of angle iron so that said elements when the frame is applied to a cake of ice will rest upon the surface thereof, and the areas of ice defined between the elements will be of determined weights when scored. The portable cutting device 3 when placed in engagement with the elements 7 and moved over the surface of the ice will be guided in a selected course so that the sections or blocks thereof will be of determined weights and evenly cut. The guides and measuring elements 2 and 7, may be disposed and arranged in several ways, thus enabling one to cut or score the cakes of ice into such sizes, shapes and weights of the different sections or blocks thereof as may be considered desirable and suitable for the demands of the trade being served.

These ice scoring devices or guides are designed primarily for use in connection with an ice truck—the subject matter of a co-pending application—which truck handles a cake of ice and places it in a horizontal position at the proper height for using these guides with a portable electric saw. These three items or devices—guides, truck and saw—thus form a complete ice scoring machine.

Having described the invention, I claim:

1. An ice scoring device comprising a main frame adapted to be positioned about a cake of ice, and a plurality of elements carried by the main frame and engaging with the surface of the ice to form guides for a portable cutting device so that the sections or blocks of ice cut from the cake of ice will be of determined weights, a depending projection on the main frame and adapted to engage with a shoe of a truck between said shoe and the cake of ice to aid in properly positioning the main frame on the ice.

2. An ice scoring device comprising a main frame adapted to be positioned about a cake of ice below the top surface of the latter, a plurality of elements integral with said frame and each including horizontally and vertically arranged portions, said horizontal portions resting upon the top surface of the ice and the vertical portions engaging with the vertical walls of the ice, said horizontal portions providing guides for a portable ice cutting device whereby the ice may be cut into sections or blocks of determined weights.

CHARLES A. SMITH.